(12) United States Patent
Huang et al.

(10) Patent No.: US 8,477,432 B2
(45) Date of Patent: Jul. 2, 2013

(54) IMAGE LENS WITH LOW CHROMATIC ABERRATION AND HIGH RESOLUTION

(75) Inventors: Hai-Jo Huang, New Taipei (TW);
Fang-Ying Peng, New Taipei (TW);
Xiao-Na Liu, Guangdong (CN);
Sheng-An Wang, New Taipei (TW);
An-Tze Lee, New Taipei (TW)

(73) Assignees: Hong Fu Jin Precision Industry (shenZhen) Co., Ltd., Shenzhen (CN);
Hon Hai Precision Industry Co., Ltd., New Taipei (TW)

( * ) Notice: Subject to any disclaimer, the term of this patent is extended or adjusted under 35 U.S.C. 154(b) by 4 days.

(21) Appl. No.: 13/315,294

(22) Filed: Dec. 9, 2011

(65) Prior Publication Data
US 2013/0107375 A1    May 2, 2013

(51) Int. Cl.
*G02B 3/02* (2006.01)
(52) U.S. Cl.
USPC .......................................... 359/714

(58) Field of Classification Search
USPC .................................. 359/708, 714
See application file for complete search history.

(56) References Cited

U.S. PATENT DOCUMENTS
7,663,813 B2 *   2/2010   Lai ................................ 359/770

FOREIGN PATENT DOCUMENTS
CN            201754201 U        3/2011

* cited by examiner

*Primary Examiner* — James Greece
(74) *Attorney, Agent, or Firm* — Altis Law Group, Inc.

(57) ABSTRACT

An image lens for imaging an object on an image plane, in the order from the object side to the image side thereof, includes: a first lens with negative refraction power, a second lens with positive refraction power, a third lens with negative refraction power, a fourth lens with positive refraction power, and a fifth lens. The image lens satisfies the following formula: 0.9<F2/F<1.4; wherein F2 is focal length from the second lens to the fourth lens, F is focal length of the image lens.

12 Claims, 8 Drawing Sheets

IMAGE LENS WITH LOW CHROMATIC ABERRATION AND HIGH RESOLUTION

BACKGROUND

1. Technical Field

The present disclosure relates to lenses and, particularly, to an image lens with low chromatic aberration and high resolution.

2. Description of Related Art

To be well matched with the requirement of higher imaging effect captured by the image lens, the image lens, which is essentially comprised of a number of lenses, should meet requirements, such as, high resolution, low chromatic aberration. However, the existing image lenses cannot meet both of these requirements, thus, result in poor imaging effect.

Therefore, it is desirable to provide an image lens which can overcome the limitations described above.

DETAILED DESCRIPTION

Embodiments of the disclosure will now be described in detail with reference to the accompanying drawings.

Figure 1:
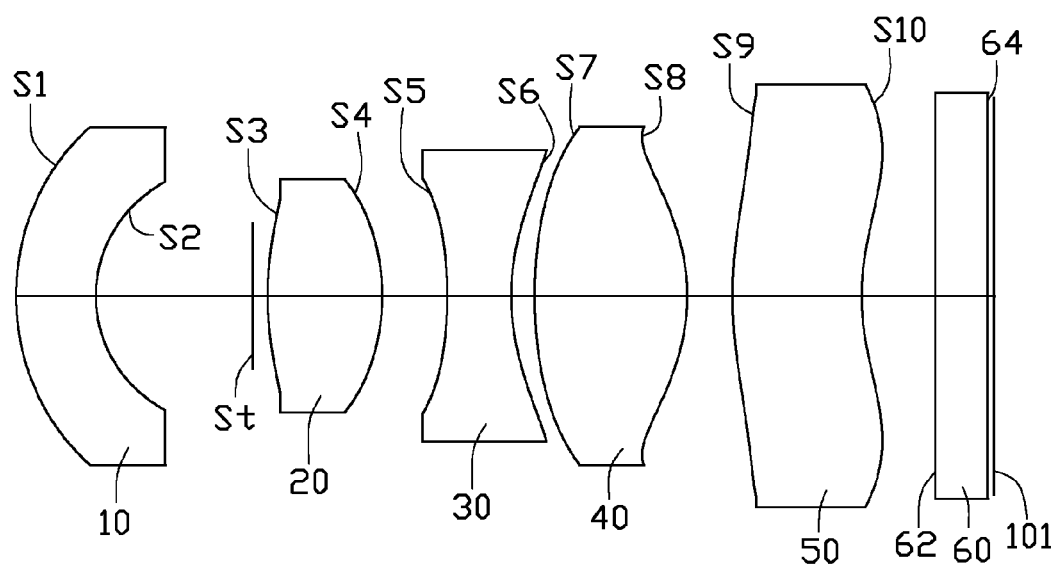
FIG. 1 is a schematic view of an image lens in accordance with a first embodiment.

Referring to FIG. 1, an image lens 100, according to a first embodiment, optically captures an image of an object at an object side and forms a corresponding image at an image side, particularly, at an image plane 101. The image lens 100 includes, in an order from the object side to the image side, a first lens 10 with negative refraction power, a second lens 20 with positive refraction power, a third lens 30 with negative refraction power, a fourth lens 40 with positive refraction power, and a fifth lens 50 with negative refraction power. The first lens 10, the second lens 20, the third lens 30, the fourth lens 40, and the fifth lens 50 are made of plastic.

The first lens 10 includes a first surface S1 facing the object side and a second surface S2 facing the image side. The second lens 20 includes a third surface S3 facing the object side and a fourth surface S4 facing the image side. The third lens 30 includes a fifth surface S5 facing the object side and a sixth surface S6 facing the image side. The fourth lens 40 includes a seventh surface S7 facing the object side and an eighth surface S8 facing the image side. The fifth lens 50 includes a ninth surface S9 facing the object side and a tenth surface S10 facing the image side.

The image lens 100 further includes an aperture stop St and a filter glass 60. The aperture stop St is positioned between the first lens 10 and the second lens 20. The filter glass 60 is positioned in the image side of the fifth lens 50. The filter glass 60 includes a front surface 62 facing the object side and a back surface 64 facing the image side. Light rays enter the image lens 100, passing trough the first lens 10, the aperture stop St, the second lens 20, the third lens 30, the fourth lens 40, the fifth lens 50, and the filter glass 60, finally forming optical images on the image plane 101. The aperture stop St is configured for controlling the amount of light rays reaching the second lens 20. The filter glass 60 filters/removes infrared light from the light rays.

An image sensor, such as charge coupled device (CCD) or complementary metal-oxide-semiconductor transistor (CMOS), can be positioned on the image plane 101 thus, converting the optically images into electrical signals. The image lens 100 and the image sensor compose a camera module.

The image lens 100 satisfies the formulas:

$$0.9 < F2/F < 1.4; \quad (1)$$

wherein F2 is focal length from the second lens 20 to the fourth lens 40, F is focal length of the image lens 100. Formula (1) is for correcting spherical aberration sufficiently, while maintaining a lower coma aberration. If formula (1) is not satisfied, spherical aberration and coma aberration cannot be both controlled to be acceptable.

The image lens 100 further satisfies the formula:

$$-0.3 < F/f5 < 0.3; \quad (2)$$

wherein f5 is focal length of the fifth lens 50. Formulas (2) is for maintaining angle of the image plane 101, while maintaining lower distortion and coma aberration. If formula (2) is not satisfied, distortion and coma aberration cannot be both controlled to be acceptable.

The image lens 100 further satisfies the formulas:

$$50 < Vd1 < 60; \quad (3)$$

$$50 < Vd2 < 60; \quad (4)$$

$$22 < Vd3 < 28; \quad (5)$$

$$50 < Vd4 < 60; \text{ and} \quad (6)$$

$$50 < Vd5 < 60; \quad (7)$$

Wherein Vd1 is the Abbe number of the first lens 10, Vd2 is the Abbe number of the second lens 20, Vd3 is the Abbe number of the third lens 30, Vd4 is the Abbe number of the fourth lens 40, and Vd5 is the Abbe number of the fifth lens 50. Formulas (3) to (7) are for easily correcting chromatic aberration of the image lens 100. If the formulas (3) to (7) are not satisfied, chromatic aberration cannot be easily controlled to be acceptable.

All of the surfaces of the first, second, third, fourth, and fifth lenses 10, 20, 30, 40, and 50 are aspherical surfaces. Each aspherical surface is shaped according to the formula:

$$x = \frac{ch^2}{1 + \sqrt{1 - (k+1)c^2h^2}} + \Sigma A_i h^i,$$

wherein h is a height from the optical axis of the image lens 100 to the aspherical surface, c is a vertex curvature, k is a conic constant, and Ai are i-th order correction coefficients of the aspherical surface.

Figure 3:
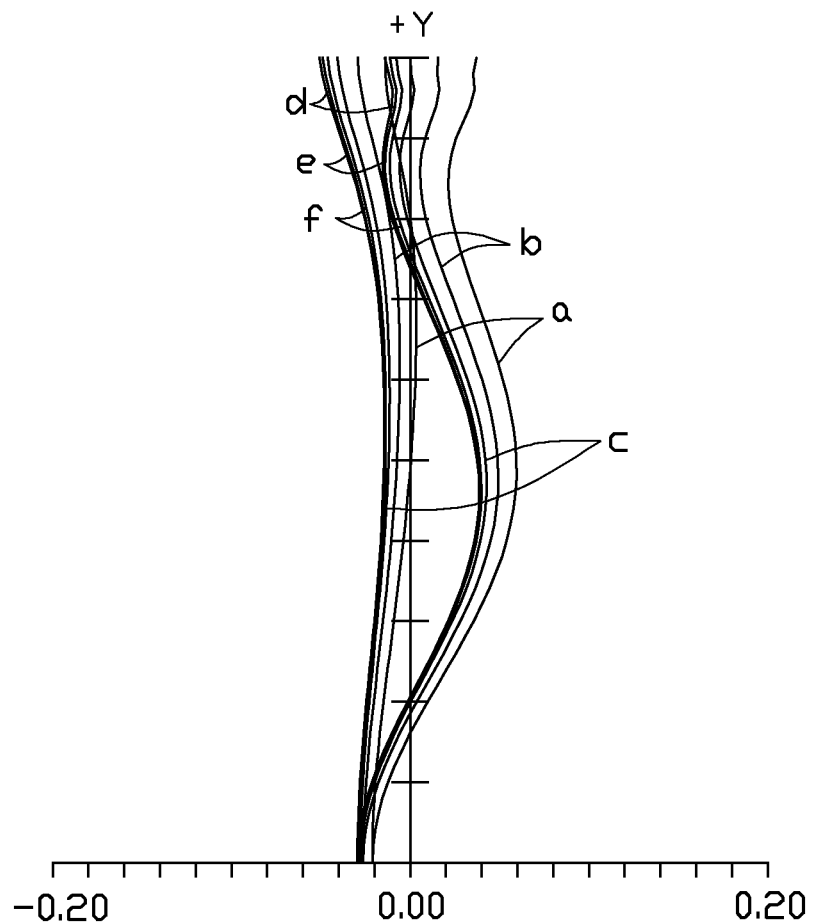
FIG. 3 is a graph showing characteristic curves of field curvature of the image lens of FIG. 1.
Figure 4:
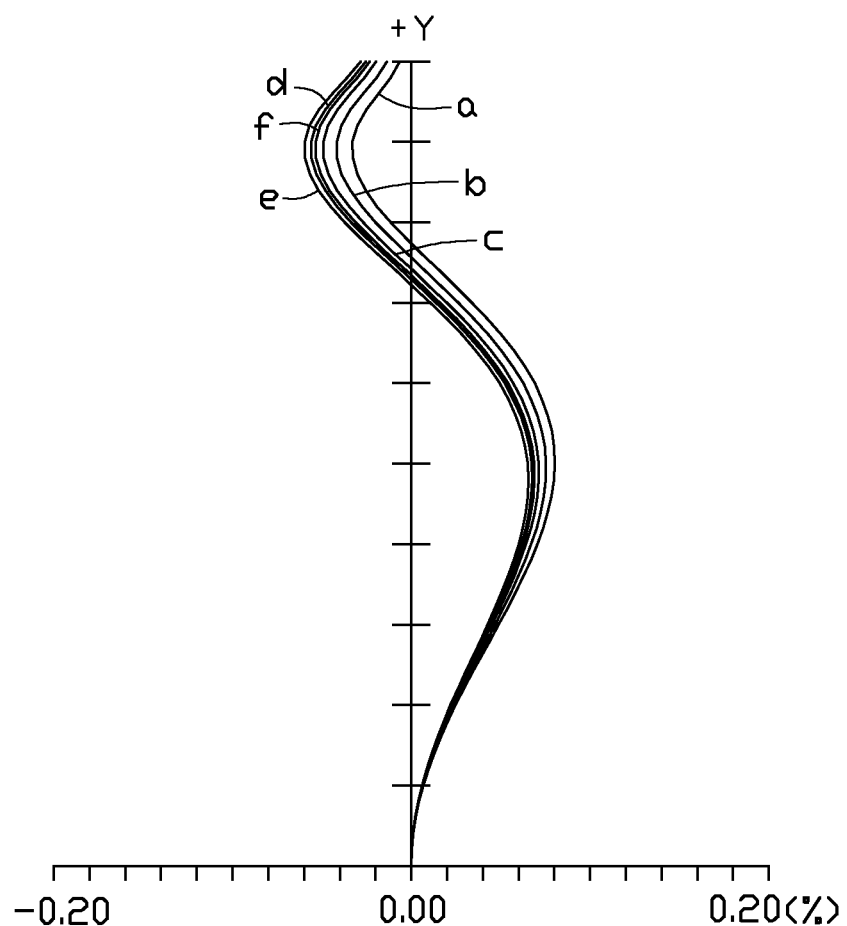
FIG. 4 is a graph showing characteristic curves of distortion of the image lens of FIG. 1 in accordance with the first embodiment.

Detailed examples of the imaging lens 100 are given below in accompany with FIGS. 2-4, but it should be noted that the imaging lens 100 is not limited by these examples. Listed below are the symbols used in these detailed examples:

F: focal length of the image lens 100;

R: radius of curvature;

D: distance between surfaces on the optical axis of the image lens 100;

Nd: refractive index of lens of d light (wavelength: 587.6 nm); and

Vd: Abbe number of d light (wavelength: 587.6 nm).

The image lens 100 of the first embodiment satisfies the tables 1-2, wherein F2/F=1.00, F/f5=−0.25, V1=56.8, V2=56.8, V3=26.6, V4=56.8, V5=56.8.

(wavelength: 555 nm), d light (wavelength: 610 nm), e light (wavelength: 650 nm), and f light (wavelength: 588 nm) of the image lens 100 of the first embodiment. In this embodiment, spherical aberration of visible light (400-700 nm) of the image lens 100 is in a range of: −0.2 mm~0.2 mm. As shown in FIG. 3, the curves T and S are the tangential field curvature curve and the sagittal field curvature curve, respectively. In this embodiment, field curvature of the image lens 100 is limited to a range of: −0.20 mm~0.2 mm. In addition, as shown in FIG. 4, distortion of the image lens 100 is limited in a range of: −2.00%~2.00%.

TABLE 1

| surface | type | R (mm) | D (mm) | Nd | Vd |
|---|---|---|---|---|---|
| first surface S1 | aspherical | 3.76761 | 1.227525 | 1.543470 | 56.803163 |
| second surface S2 | aspherical | 1.985065 | 2.419714 | — | — |
| aperture stop St | flat | infinity | 0.2276181 | — | — |
| third surface S3 | aspherical | 5.087649 | 1.766788 | 1.543470 | 56.803163 |
| fourth surface S4 | aspherical | −3.22008 | 1.001133 | — | — |
| fifth surface S5 | aspherical | −6.394318 | 0.9849292 | 1.607265 | 26.646671 |
| sixth surface S6 | aspherical | 3.530633 | 0.3620726 | — | — |
| seventh surface S7 | aspherical | 6.96977 | 2.351847 | 1.543470 | 56.803163 |
| eighth surface S8 | aspherical | −3.10395 | 0.697683 | — | — |
| ninth surface S9 | aspherical | 6.244694 | 1.988088 | 1.543470 | 56.803163 |
| tenth surface S10 | aspherical | 3.587133 | 1.1396505 | — | — |
| front surface 62 | flat | infinity | 0.8 | 1.516800 | 64.167336 |
| back surface 64 | flat | infinity | 0.0999999 | — | — |
| image plane 101 | flat | infinity | — | — | — |

TABLE 2

| aspherical coefficient | first surface S1 | second surface S2 | third surface S3 | fourth surface S4 |
|---|---|---|---|---|
| A4 | 0.0024106109 | 0.0046120323 | −0.0039616961 | 0.0020637898 |
| A6 | −0.00018990806 | −0.0024766047 | −0.00047863231 | −0.0013917755 |
| A8 | 1.1636243e−005 | 0.00071327911 | −0.0001681847 | 0.0001833684 |
| A10 | 3.9274314e−006 | −0.00010719334 | −5.8180059e−005 | −3.9608406e−005 |
| A12 | 2.4205416e−007 | −9.566162e−006 | −1.4796841e−005 | −1.6646191e−005 |
| A14 | −1.7242477e−007 | 1.1007364e−005 | −2.833782e−006 | −2.5042084e−006 |
| A16 | 1.1807571e−008 | −3.3898525e−006 | −1.9400314e−008 | 8.3195195e−007 |

| aspherical coefficient | fifth surface S5 | sixth surface S6 | seventh surface S7 | eighth surface S8 |
|---|---|---|---|---|
| A4 | −0.0090115872 | −0.0095824785 | 0.002685668 | 0.0060148274 |
| A6 | 0.00068776313 | 9.5046125e−005 | 0.00032112709 | 0.000604279 |
| A8 | −0.00060184327 | 0.00012817692 | −5.3868095e−005 | 8.8346465e−005 |
| A10 | 0.00010472931 | −5.4738553e−005 | 5.5466937e−006 | −7.0081627e−006 |
| A12 | −3.1010755e−006 | −1.2397944e−006 | 7.5671075e−007 | 6.2736265e−007 |
| A14 | −9.6424018e−006 | 2.0712973e−006 | −1.6625968e−007 | 3.9907995e−007 |
| A16 | 1.979966e−006 | −2.0180435e−007 | 8.4599716e−009 | −2.9214952e−008 |

| aspherical coefficient | ninth surface S9 | tenth surface S10 |
|---|---|---|
| A4 | −0.0085666512 | −0.020188012 |
| A6 | 0.00044798086 | 0.00040042845 |
| A8 | −1.2063937e−005 | −1.8051688e−005 |
| A10 | 3.2626591e−007 | 3.1777995e−007 |
| A12 | −1.0307008e−008 | 5.565237e−008 |
| A14 | −1.9183477e−009 | −2.2375765e−011 |
| A16 | 4.3153059e−010 | −7.6909728e−010 |

Figure 2:
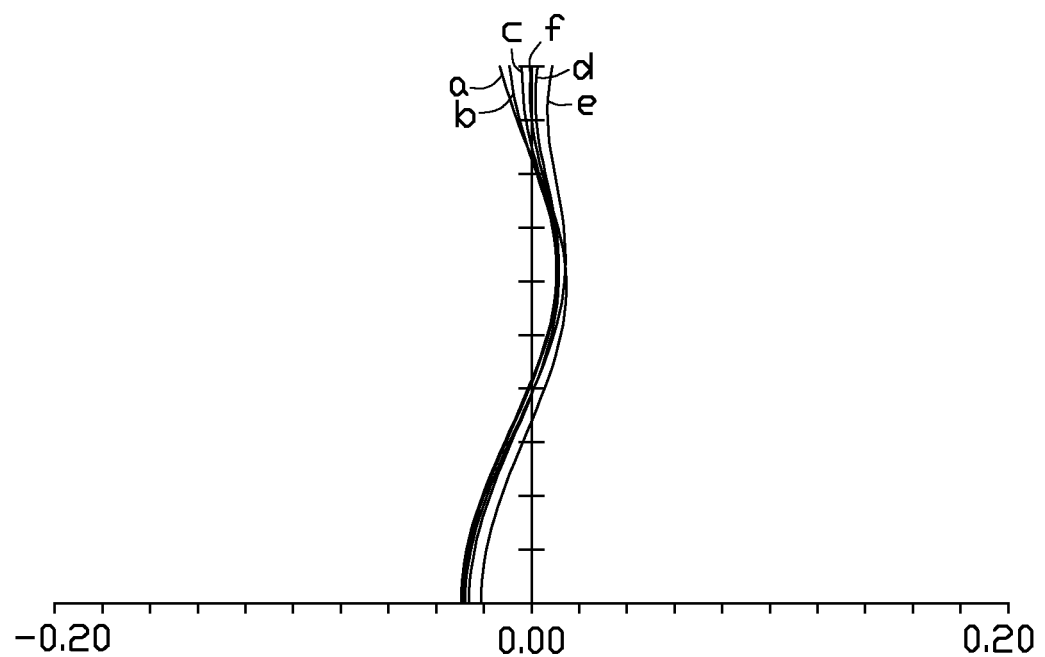
FIG. 2 is a graph showing characteristic curves of spherical aberration of the image lens of FIG. 1.
Figure 5:
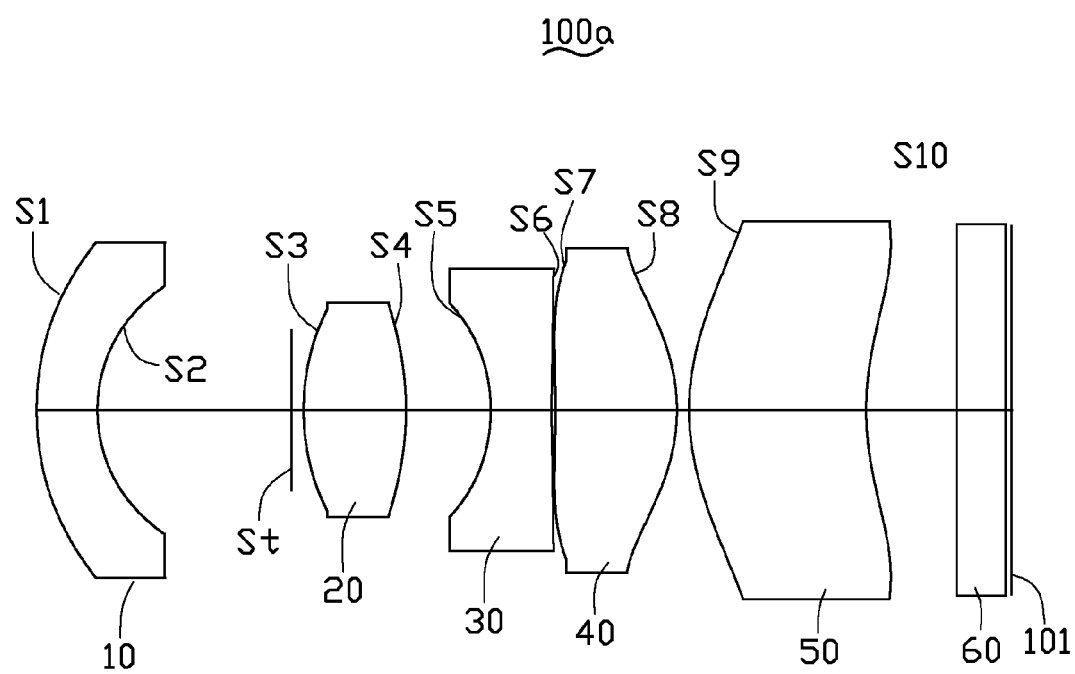
FIG. 5 is a schematic view of an image lens in accordance with a second embodiment.

As shown in FIG. 2, curves a, b, c, d, e, and f are respective spherical aberration characteristic curves of a light (wavelength: 470 nm), b light (wavelength: 510 nm), and c light Referring to FIG. 5, a second embodiment of a image lens 100a is similar to the image lens 100 of FIG. 1, except the fifth lens 50 with positive refraction power. The image lens 100a satisfies the tables 3-4, wherein F2/F=1.30, F/f5=0.27, V1=55.8, V2=55.8, V3=23.2, V4=55.8, V5=55.8.

TABLE 3

| surface | type | R (mm) | D (mm) | Nd | Vd |
|---|---|---|---|---|---|
| first surface S1 | aspherical | 4.670118 | 0.9999943 | 1.531131 | 55.753858 |
| second surface S2 | aspherical | 2.5 | 3.188379 | — | — |
| aperture stop St | flat | infinity | 0.199998 | | |
| third surface S3 | aspherical | 3.875391 | 1.684171 | 1.531131 | 55.753858 |
| fourth surface S4 | aspherical | −4.924176 | 1.391732 | — | — |
| fifth surface S5 | aspherical | −2.83694 | 0.9999902 | 1.632720 | 23.239886 |
| sixth surface S6 | aspherical | 18.71234 | 0.06335446 | — | — |
| seventh surface S7 | aspherical | −27.57643 | 1.997386 | 1.531131 | 55.753858 |
| eighth surface S8 | aspherical | −3.103087 | 0.1999878 | — | — |
| ninth surface S9 | aspherical | 3.973711 | 2.912344 | 1.531131 | 55.753858 |
| tenth surface S10 | aspherical | 4.760514 | 1.4860021 | — | — |
| front surface 62 | flat | infinity | 0.8 | 1.516800 | 64.167336 |
| back surface 64 | flat | infinity | 0.0999999 | — | — |
| image plane 101 | flat | infinity | — | — | — |

TABLE 4

| aspherical coefficient | first surface S1 | second surface S2 | third surface S3 | fourth surface S4 |
|---|---|---|---|---|
| A4 | 0.0028690783 | 0.0050407279 | 0.0020825072 | 0.0034320261 |
| A6 | −0.00023114941 | −0.00047765659 | 0.00015065482 | 5.0493547e−005 |
| A8 | 3.4552589e−006 | −6.736511e−007 | −6.3299017e−006 | −1.3243249e−005 |

| aspherical coefficient | fifth surface S5 | sixth surface S6 | seventh surface S7 | eighth surface S8 |
|---|---|---|---|---|
| A4 | −0.0079648702 | −0.011283673 | 0.0047641918 | 0.0048436948 |
| A6 | −8.367926e−006 | 0.0018089078 | 0.0011196558 | 0.00086883105 |
| A8 | 0.00011134652 | −7.0948947e−005 | −9.9506909e−005 | 5.3798597e−005 |

| aspherical coefficient | ninth surface S9 | tenth surface S10 |
|---|---|---|
| A4 | −0.0052676713 | −0.0061126345 |
| A6 | −8.7585082e−005 | −0.00046790906 |
| A8 | −4.7304849e−006 | 2.5108534e−005 |

Figure 6:
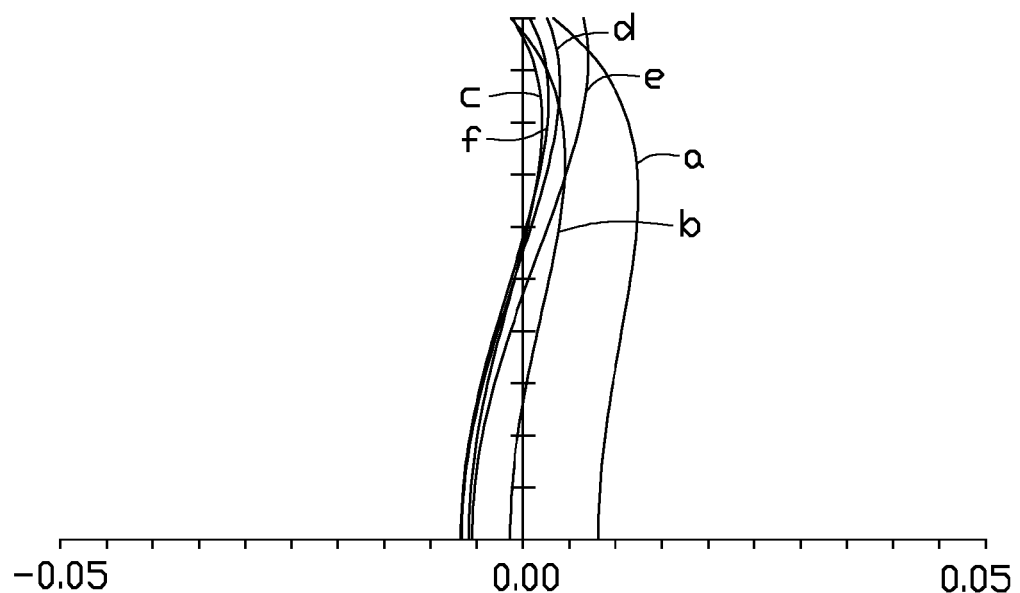
FIG. 6 is a graph showing characteristic curves of spherical aberration of the image lens of FIG. 5.
Figure 7:
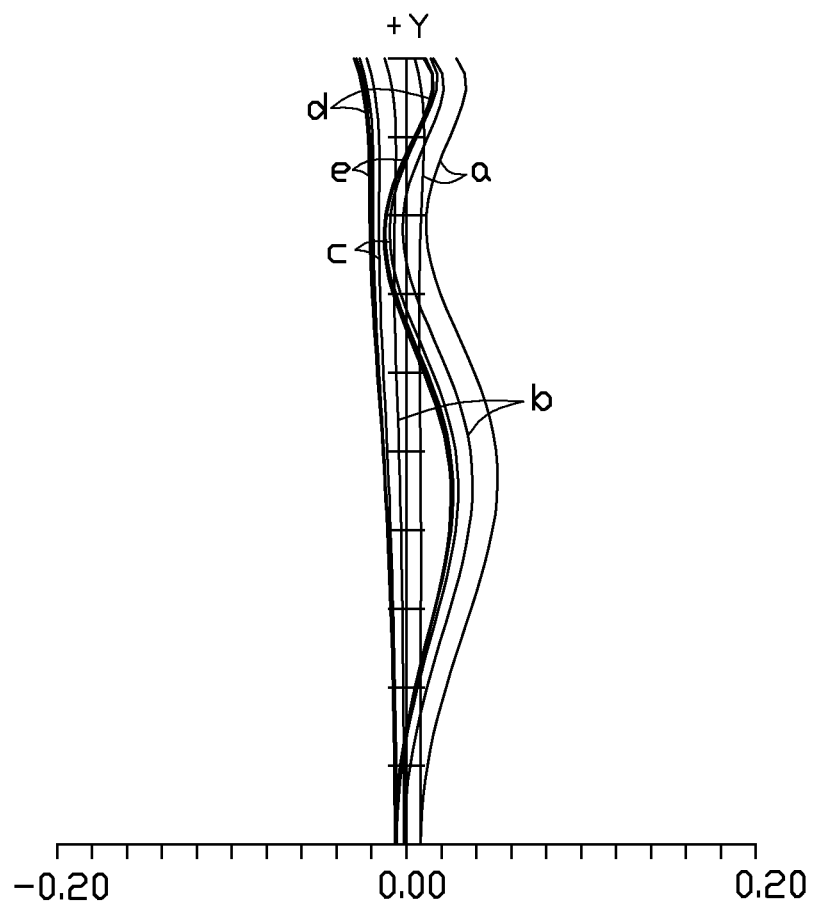
FIG. 7 is a graph showing characteristic curves of field curvature of the image lens of FIG. 5.
Figure 8:
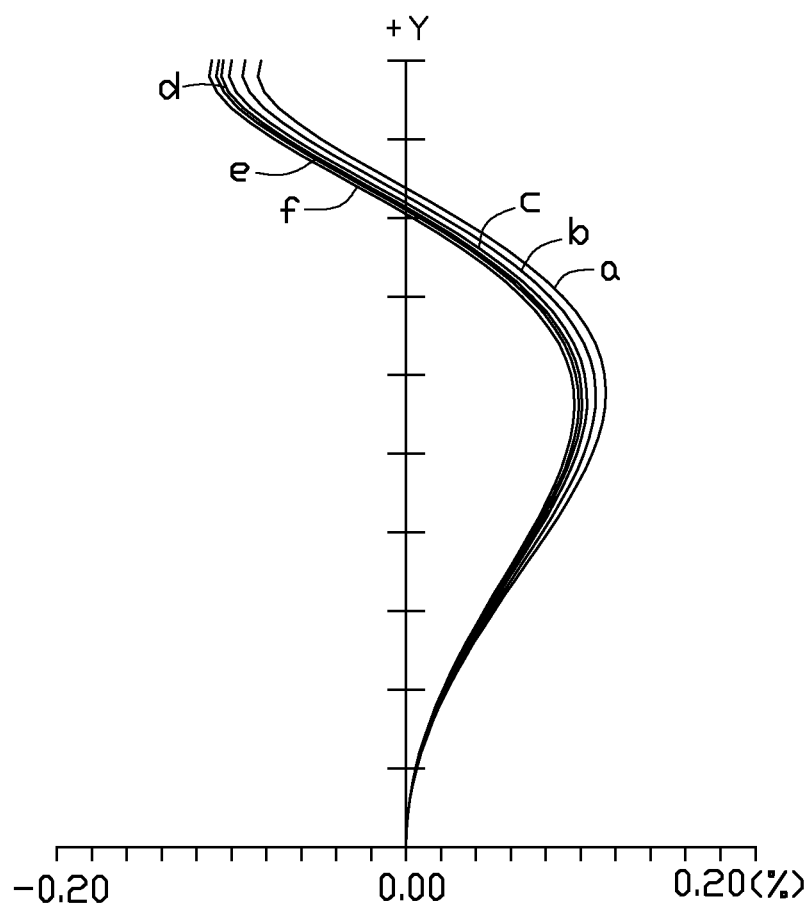
FIG. 8 is a graph showing characteristic curves of distortion of the image lens of FIG. 5.

As shown in FIG. 6, the curves a, b, c, d, e, and f are respective spherical aberration characteristic curves of a light (wavelength: 470 nm), b light (wavelength: 510 nm), and c light (wavelength: 555 nm), d light (wavelength: 610 nm), e light (wavelength: 650 nm), and f light (wavelength: 588 nm) of the image lens 100a of the second embodiment. In this embodiment, spherical aberration of visible light (400-700 nm) of the image lens 100a is in a range of: −0.05 mm~0.05 mm. As shown in FIG. 7, the curves T and S are the tangential field curvature curve and the sagittal field curvature curve, respectively. In this embodiment, field curvature of the image lens 100a is limited to a range of: −0.20 mm~0.20 mm. In addition, as shown in FIG. 8, distortion of the image lens 100a is limited in a range of: −2.00%~2.00%.

Particular embodiments are shown and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. An image lens for imaging an object on an image plane, in the order from the object side to the image side thereof, comprising:

a first lens with negative refraction power;
a second lens with positive refraction power;
a third lens with negative refraction power;
a fourth lens with positive refraction power; and
a fifth lens;
wherein the image lens satisfies the following formula:

$$0.9 < F2/F < 1.4; \quad (1)$$

wherein F2 is focal length from the second lens to the fourth lens, F is focal length of the image lens.

2. The image lens as claimed in claim 1, wherein the image lens further satisfies the formula:

$$-0.3 < F/f5 < 0.3; \quad (2)$$

wherein f5 is focal length of the fifth lens.

3. The image lens as claimed in claim 2, wherein the image lens further satisfies the formulas:

$$50 < Vd1 < 60; \quad (3)$$

$$50 < Vd2 < 60; \quad (4)$$

$$22 < Vd3 < 28; \quad (5)$$

$$50 < Vd4 < 60; \text{ and} \quad (6)$$

$$50 < Vd5 < 60; \quad (7)$$

Wherein Vd1 is the Abbe number of the first lens, Vd2 is the Abbe number of the second lens, Vd3 is the Abbe number of the third lens, Vd4 is the Abbe number of the fourth lens, and Vd5 is the Abbe number of the fifth lens.

4. The image lens as claimed in claim 1, wherein the fifth lens has positive refraction power.

5. The image lens as claimed in claim 1, wherein the fifth lens has negative refraction power.

6. The image lens as claimed in claim 1, wherein the first lens, the second lens, the third lens, the fourth lens, and the fifth lens are made of plastic.

7. The image lens as claimed in claim 1, wherein the image lens further comprises a aperture stop positioned between the first lens and the second lens, the aperture stop is configured for controlling the amount of light rays reaching the second lens.

8. The image lens as claimed in claim 1, wherein the image lens further comprises a filter glass positioned on an image side of the fifth lens, the filter glass is configured for filtering infrared light.

9. The image lens as claimed in claim 1, wherein all of the first, second, third, fourth, and fifth lenses are aspherical lenses.

10. The image lens as claimed in claim 1, wherein the third lens comprises a concave surface facing the object side, and a concave surface facing the image side.

11. The image lens as claimed in claim 1, wherein the fourth lens comprises a convex surface facing the image side.

12. The image lens as claimed in claim 1, wherein the fifth lens comprises a convex surface facing the object side, and a concave surface facing the image side.

* * * * *